Patented Oct. 23, 1951

2,572,570

UNITED STATES PATENT OFFICE 2,572,570

DIAMINODIPHENYLSULFONE DERIVATIVES

Milton Kosmin, Dayton, Ohio, assignor to Monsanto Chemical Company, St. Louis, Mo., a corporation of Delaware No Drawing. Application November 24, 1948, Serial No. 61,893

4 Claims. (Cl. 260—397.6)

This invention relates to a new family of bacteristats and bactericides having unusual activity. More particularly the invention relates to derivatives of 4,4'-diaminodiphenyl sulfone which show an unusual inhibitory effect on the growth of various strains of bacteria.

It is known that 4,4'-diaminodiphenyl sulfone is an active agent for controlling bacteria, and in particular the virulent human strain of tuberculosis bacteria, Mycobacterium tuberculosis H37Rv. This activity has only been noted in bacteria cultures because the 4,4'-diaminodiphenyl sulfone is not water soluble and not capable of use in contact with living animal tissues. In order to adapt the 4,4'-diaminodiphenyl sulfone to medical and veterinary uses, it has been converted into other molecular forms by substituting it with hydrophilic radicals, which render the molecule soluble in water without destroying all of the therapeutic efficacy. One such method used by the prior art involves the preparation of a medicinal compound known as "Promin" which has the following structure:

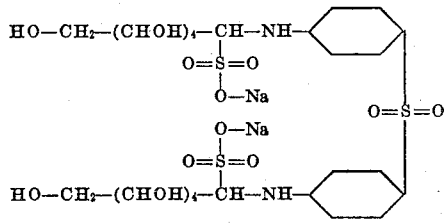

This substituted product of 4,4'-diaminodiphenyl sulfone, although it is water soluble and widely used as a therapeutic agent, leaves much to be desired by reason of the serious reduction in the effectiveness of inhibiting growth of the tuberculosis bacteria.

The primary purpose of this invention is to provide new derivatives of 4,4'-diaminodiphenyl sulfone which will more effectively inhibit the growth of tuberculosis bacteria. A further purpose of the invention is to provide means of rendering 4,4'-diaminodiphenyl sulfone water soluble without reducing the therapeutic benefits. A still further purpose of this invention is to provide new and valuable therapeutic agents.

In accordance with this invention, it has been discovered that water soluble derivatives of unusual activity may be produced by substituting one or both of the amino groups of diaminodiphenyl sulfone with a benzyl radical having long aliphatic chains substituted thereon. The new class of chemical compounds may have the molecular structure:

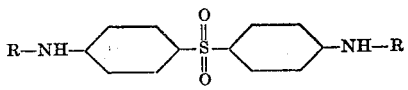

wherein R is either hydrogen or a radical of the structure:

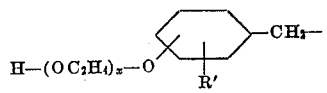

wherein R' is either hydrogen or an alkyl radical having up to eighteen carbon atoms, and $x$ is a whole number from five (5) to thirty (30), inclusive, and wherein not more than one of the R groups is hydrogen.

The new compounds are prepared from polyglycol ethers of phenols which may also have an alkyl substituent. The said ethers are converted to the chloromethyl derivatives by reaction with formaldehyde followed by treatment with hydrochloric acid. The 4,4'-diaminodiphenyl sulfone is then condensed with the chloromethyl compound in the presence of a mild alkaline agent, such as sodium bicarbonate, in an aqueous medium. The new compounds are then separated from the aqueous reaction mass by cooling and adding saturated salt solution.

The new chemical compounds are useful in the control of bacteria, and especially in arresting the development of tuberculosis in animal tissues.

Example 1

Twenty parts by weight of 37 percent formaldehyde solution was mixed with 60 grams of concentrated hydrochloric acid. The mixture was then cooled to room temperature and 69 parts of isooctyl phenol to which approximately 12 moles of ethylene oxide had been condensed, was added slowly over a period of twenty minutes. The mixture was cooled and hydrochloric acid gas was bubbled in slowly with cooling until no further chemical reaction took place as evidenced by the reaction temperature. The resulting clear, colorless solution was then neutralized with sodium bicarbonate, and a viscous liquid product was separated by adding a saturated sodium chloride solution. The separated product was removed and carefully dried. The compound was believed to be the chloromethyl compound.

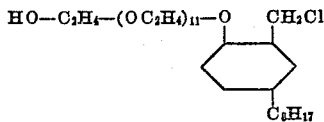

A mixture of 15 grams of water, 5.3 grams of sodium bicarbonate and 12.4 grams of 4,4'-diaminodiphenyl sulfone was prepared, and 37 grams of the chloromethyl compound was added slowly. The mixture was then heated at 90 to 95° C. for four hours. The condensation product was separated out by adding a saturated sodium chloride solution and warming the reaction mass. An analysis of the product showed 2.92 percent nitrogen, whereas the theoretical nitrogen content is 2.94.

*Example 2*

The tuberculostatic effect of the compounds prepared in the preceding example was tested using cultures of *Mycobacterium tuberculosis* H37Rv, and measuring the minimum concentration of the drug which would inhibit the growth of the bacteria. Simultaneous determinations were made by the identical method using "Promin" and 4,4'-diaminodiphenyl sulfone. The insolubility of the latter material was overcome by using a small concentration of ethylene glycol which is known to have no inhibiting effect on the growth of the bacteria. The following table sets forth the minimum concentration in milligram percent which is effective in inhibiting the growth of the bacteria for each of the reagents tested.

| | |
|---|---|
| Compound prepared in Example 1 | 0.07 |
| Promin | 65 |
| Diaminodiphenyl sulfone | 0.6 |

The above data clearly demonstrate that a compound prepared in accordance with this invention is approximately one thousand times as effective as a commercially available drug prepared for the same purpose. It will also be noted that the new compound is approximately ten times as effective as the unsubstituted diaminodiphenyl sulfone, and at the same time is water soluble, whereas the diaminodiphenyl sulfone is of little practical utility because of its water insolubility.

The invention is defined by the following claims.

I claim:

1. A reaction product of one mole of 4,4'-diaminodiphenyl sulfone with from one to two moles of a product made by reacting equal-molar quantities of each of the compounds formaldehyde, hydrochloric acid and a compound of the following structure:

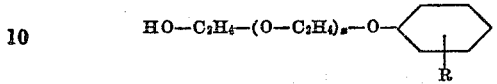

wherein R is a radical of the group consisting of hydrogen and alkyl having up to eighteen carbon atoms, and $x$ is a small whole number from five (5) to thirty (30).

2. A reaction product of 4,4'-diaminodiphenyl sulfone with one mole of a product made by reacting equal-molar quantities of each of the compounds formaldehyde, hydrochloric acid and a compound of the following structure:

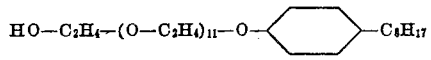

3. A method of preparing a derivative of 4,4'-diaminodiphenyl sulfone which comprises reacting one mole of 4,4'-diaminodiphenyl sulfone with one to two moles of the product made by reacting equal-molar quantities of each of the compounds formaldehyde, hydrochloric acid and a compound of the following structure:

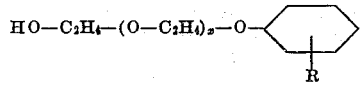

wherein R is a radical of the group consisting of hydrogen and alkyl having up to eighteen carbon atoms, and $x$ is a whole number from five (5) to thirty (30).

4. A method of preparing a derivative of 4,4'-diaminodiphenyl sulfone which comprises reacting equimolecular proportions of 4,4'-diaminodiphenyl sulfone and a product made by reacting equal-molar quatities of each of the compounds formaldehyde, hydrochloric acid and a compound of the following structure:

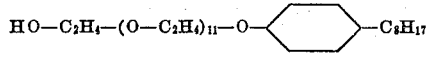

MILTON KOSMIN.

No references cited.